Feb. 17, 1953 L. D. KLEISS 2,628,499
FLUID VELOCITY RESPONSIVE REGULATING OR INDICATING MEANS
Filed May 16, 1949

INVENTOR.
L. D. KLEISS
BY Hudson & Young
ATTORNEYS

Patented Feb. 17, 1953

2,628,499

UNITED STATES PATENT OFFICE 2,628,499

FLUID VELOCITY RESPONSIVE REGULATING OR INDICATING MEANS

Louis D. Kleiss, Borger, Tex., assignor to Phillips Petroleum Company, a corporation of Delaware Application May 16, 1949, Serial No. 93,586

6 Claims. (Cl. 73—228)

This invention relates to devices responsive to the rate of flow of a flowing fluid. In one aspect it has particular relation to fluid velocity indicating and recording methods and means for carrying out the same. In another specific aspect it relates to regulating the operation of a system in response to the velocity of flow of a fluid in a portion of the system.

Numerous disadvantages exist in fluid velocity indicating, recording and controlling devices of the prior art. Many have a sliding seal, or a reciprocating rod passing through a stuffing box. The friction on such a seal is high and quite variable, which results in inaccurate readings, and pressure inside the meter tends to extrude the sliding shaft causing a false reading. It is important to avoid having the buoyancy of the float affect the reading. It is important to avoid setting up eddy currents in the fluid, or building up sludge deposits, or trapping vapor, as often occurs when the meter has a long uniform central passage for the fluid. In measuring volatile and inflammable liquids and gases, it is dangerous to employ electrical apparatus.

One object of the present invention is to provide an improved method of measuring the velocity of a fluid and improved means for carrying out this method.

Another object is to provide a method and means of recording said velocity.

Another object is to provide a method and means of controlling and regulating a portion of a system by said velocity of said fluid.

Numerous other objects and advantages will be apparent to those skilled in the art upon reading the specification, claims and drawings.

Figure 1:
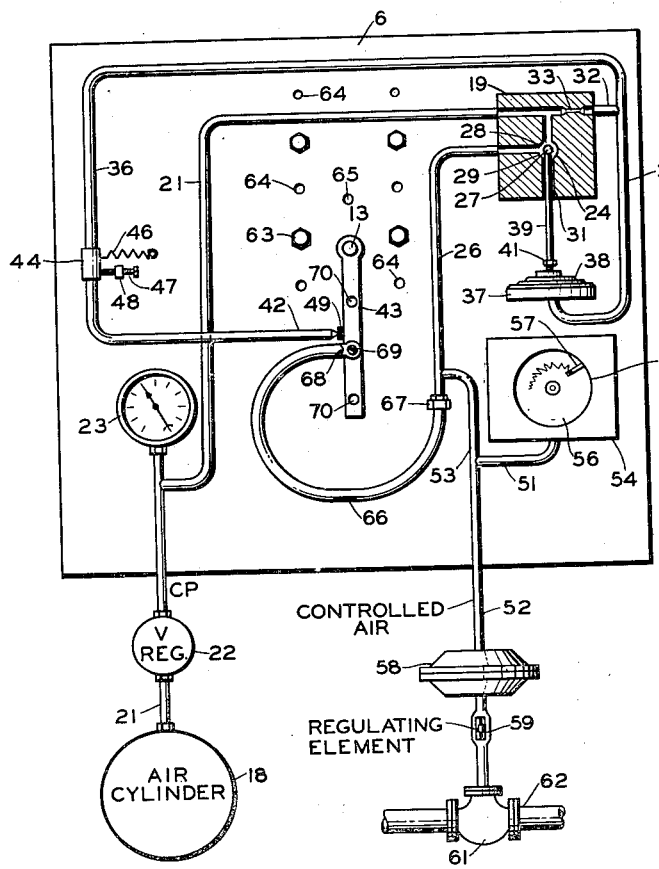
Figure 1 is an elevational view of the external portion of a system embodying the present invention with parts in cross section to show details of construction.
Figure 2:
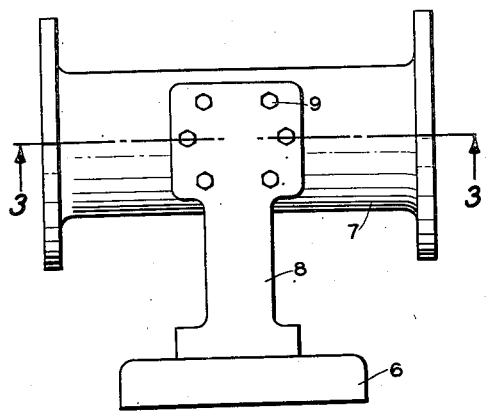
Figure 2 is a plan view of a portion of the apparatus shown in Figure 1.
Figure 3:
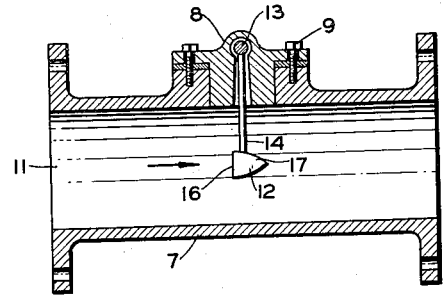
Figure 3 is a cross sectional elevational view of the apparatus shown in Figure 2 taken along the line 3—3 looking in the direction indicated.

In Figure 1, a base 6 is provided to which other portions of the apparatus may be secured. As shown in Figure 2 the base 6 is secured to conduit 7 through which the fluid, the velocity of which is to be measured, is flowing by housing 6 and suitable fastening means such as machine screws 9. As shown in Figure 3 the fluid is flowing through passage 11 in conduit 7 in the direction indicated by the arrow. The fluid exerts a force on target 12 which is determined by the velocity of the fluid which force can be calibrated and is roughly proportional to the square root of the velocity of the fluid within the conduit 11.

In Figure 3 a shaft 13 is pivoted to said base 8 about an axis disposed perpendicular to the direction of flow of said fluid. Said shaft 13 has a first lever arm 14 secured to said shaft and extending into said fluid in 11. A target 12 is preferably secured to lever arm 14 in order to obtain a more accurate result although it should be understood that lever arm 14 itself could be used without a special target to obtain results of some value. In fact target 12 may be integral with lever 14 if desired and may be regarded as a part of arm 14. While various forms for target 12 may be employed such as a sphere or flat disc (not shown), it is preferred to employ a target 12 having a flat face 16 and a streamlined tail portion 17 so that the full force of the fluid strikes face 16 and tail 17 prevents or minimizes the setting up of eddy currents or turbulence in the fluid. Shaft 13 passes through suitable packing which allows rotation but preferably prevents reciprocation and emerges outside of conduit 7 as shown in Figure 1 by passing through arm 8 and base 6.

In Figure 1 a source of pressure fluid, preferably compressed air, is shown in the form of an air cylinder 18 which is connected to a valve body 19 by means of a conduit 21. Obviously, other sources of pressure fluid, such as pumps or compressors may be employed, and other pressure fluids may be used including not only gases but liquids. Obviously, air is preferable because it can be released to the atmosphere without any fire hazards or disposal problems. Obviously, the device will operate more accurately with a constant pressure which may be obtained by any known means such as a constant pressure regulating valve 22 set to maintain a constant pressure downstream of the valve. If it is desired to check this pressure from time to time, this may be done by installing a suitable pressure gage 23 connected to line 21 as shown.

Valve body 19 has a valve chamber 24 and a control conduit 26 which is in communication with the central portion of the chamber 24. A valve 27 is disposed in chamber 24 and is movable to seat on either one of valve seats 28 or 29 which form opposite ends of chamber 24. Pressure fluid from conduit 21 enters chamber 24 through seat 28 and escapes from chamber 24 by seat 29 and exhaust conduit 31 to the atmosphere depending upon the position of valve 27.

A second fluid pressure supply conduit 32 is provided which connects to conduit 21 through a restricted orifice 33. Conduit 32 has two branches, 34 and 36. Branch 34 communicates with a fluid motor 37, the preferred form being a capsular chamber. This capsular chamber is merely a closed chamber secured to base 6 and having a movable top preferably in the form of a corrugated diaphragm (common in aneroid barometers), but the movable top may be a piston fitting in a cylinder, or other equivalents (not shown).

Moving with top 38 of chamber 37 is a rod 39 which is secured to top 38 by any suitable adjusting means 41. Means 41 allows adjustment of the length of rod 39 between valve 27 and top 38.

The other branch 36 runs to an open nozzle 42, which nozzle is positioned relative to second lever arm 43 by means of support 44 movably mounted on base 6 so it may be placed in an adjusted position. One means of adjusting the position of nozzle 42 is to have a spring 46 urging support 44 to the right and a screw 47 in a lug 48 for moving support 44 to the right or left, lug 48 being secured to base 6.

Shaft 13, which was seen to have first lever arm 14 secured to it in Figure 3, has a second lever arm 43 secured to it as shown in Figure 1. While nozzle 42 could blow directly on lever arm 43, it is possible to secure better control by having a small pad 49 secured on the arm and contacting the nozzle 42 when urged against the same. Pad 49 may be any resilient material such as rubber or plastic, but it should not yield too much as otherwise it will introduce a lag into the readings. Rather than have it yielding enough to introduce a lag, it is preferable to have pad 49 made out of steel, as the device will work in a suitable manner with a steel pad.

Control conduit 26 communicates with a recording conduit 51 and a regulating conduit 52 through branch conduit 53. The recording conduit 51 communicates with a recording pressure gage 54 which contains the usual clock driven chart 56 and pressure positioned arm 57 having a pen or other marking means on its end.

Regulating conduit 52 leads to a suitable fluid motor 58. Motor 58 is shown as a diaphragm type expansible chamber motor (which motors are often provided with a spring return for the diaphragm (not shown). A regulating element 59 is driven by fluid motor 58 and may be used to operate a throttle valve 61 controlling a flow through conduit 62 as shown.

Conduit 62 is merely an example as any other element may be regulated such as electrical switches or the like in its place, whereby a system containing the same may be regulated by the velocity of fluid in pipe 11. For example pipe 62 may contain steam or pressure fluid from a source 80 of the same driving a motor 81 (see Figure 5) having an exhaust 82 and the motor may be driving a pump 83 pumping fluid from line 84 into conduit 85 of which conduit 11 is a part, which pump is responsible for the velocity of fluid in conduit 11, in which case the velocity of fluid in 11 may be regulated and kept constant by the system of Figure 5 as an increase in velocity in 11 operating the controls on base 6 as shown in Figure 1 might be employed to reduce the power furnished to the pump 83 from motor 81 through the usual mechanical connection 86 by the apparatus on base 6 throttling the flow of fluid in line 62 by closing valve 61 through regulating element 59 as connected in Figure 1.

Base 6 is secured to arm 8 by screws 63 by providing a plurality of holes 64, the base 6 may be adjusted upwardly or downwardly from the position shown in Figure 1 in order to give the instrument a different range of velocities to control. Similarly arm 43 may be made removable from shaft 13 so that arms of different lengths may be substituted, and shaft 13 can emerge from hole 65, or a hole an equal distance below 13 when base 6 is adjusted down or up as stated.

Conduit 26 communicates with Bourdon tube 66 through a fitting 67, which is secured to base 6. While the preferred form is a Bourdon tube, it is understood that another form of fluid motor such as a bellows, diaphragm, or cylinder and piston may be employed. Bourdon tube 66 is closed at its other end which end 68 is secured to arm 43 by pivot 69. A series of holes 70 may be provided so that pivot 69 may be placed in any one of the same to vary the effect of Bourdon tube 66. Holes 64, 65 and 70 are all equally spaced.

Figure 4:
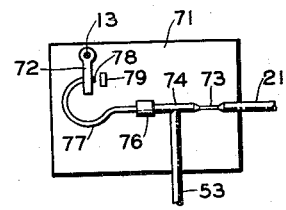
Figure 4 is a modification of the apparatus shown in Figure 1 which also embodies the present invention.

In Figure 4, a simpler form of the apparatus is shown. Shaft 13 emerges through base 71. Base 71 is mounted on conduit 7 in the same manner as base 6. Shaft 13 has a second lever arm 72 (corresponding to arm 43).

Conduit 21 is a source of air under constant pressure and may consist of tank 18, regulating valve 22 and pressure gage 23 as shown in Figure 1. Air from 21 passes through a restricted orifice 73 into a chamber 74 from which it may pass through fitting 76 secured to base 71 into Bourdon tube 77.

Bourdon tube 77 is different from Bourdon tube 66 because tube 66 was closed whereas tube 77 has an open nozzle 78 at its end. Nozzle 78 is secured to arm 72 and as arm 72 rotates about pivot 13, nozzle 78 is urged against lug 79 secured to base 71.

Chamber 74 communicates with connecting conduit 53. The same number is given conduit 53 in Figure 4 as in Figure 1 because it may be connected to a recording pressure gage 54 by conduit 51 and/or a fluid motor 58 connected to it by conduit 52 as may be desired.

*Operation*

The operation of the species shown in Figure 1 is as follows:

A relatively constant air pressure is being maintained in conduit 21 by a suitable means such as cylinder 18 and regulating valve 22 regardless of the position of valve 27. Air in 21 is passing through seat 28, bleeding around valve 27, passing through seat 29 and emerging to the atmosphere through exhaust conduit 31. At the same time air in conduit 21 is bleeding through orifice 33, conduit 32 and conduit 36 to pass out nozzle 42 to the atmosphere. The amount of air that bleeds through nozzle 42 depends on the rotary position around pivot 13 of arm 43 carrying pad 49 which obstructs nozzle 42 to a greater or lesser degree depending on the position of arm 43.

The pressure in conduit 34 varies according to the amount of pressure fluid escaping through nozzle 42 because restricted orifice 33 restricts the replacement of fluid lost through nozzle 42 from constant pressure source 21. The pressure in conduit 34 is balanced against atmospheric pressure by top 38 of chamber 37. The top 38 deforms as the pressure in chamber 37 rises moving valve 27 to close seat 28 and at the same time the more top 38 is distorted, the greater stress is created in top 38, which stress adds a force to that of the atmosphere tending to resist the pressure of fluid in chamber 37.

Chamber 24 is communicating with either or both constant pressure source 21 and/or exhaust conduit 31 and the pressure in 26 depends on the position of valve 27. Bourdon tube 66 is at the same pressure as conduit 26 and as this pressure increases the Bourdon tube 66 is straightened out moving arm 43 to rotate about pivot 13 and close nozzle 42 with pad 49. At the same time the pressure in 26 and 66 also is maintained in conduits 51, 52 and 53 where it may be recorded on recording pressure gage 54 and may be used to operate fluid motor 58 to move regulating element 59 to open or close valve 61 or operate any other regulator, such as a switch or bank of electrical switches (not shown).

The parts of Figure 1 are so proportioned and constructed that with a constant fluid velocity in conduit 11 which velocity is in the central portion of the measuring range of the instrument, valve 27 will maintain a position intermediate seats 28 and 29 and pad 49 will not quite close nozzle 42 so that pressure fluid will be leaking out of nozzle 42 and out of exhaust conduit 31. Suppose then the velocity of the fluid in 11 increases:

With the increased velocity more force is exerted on target 16 moving lever arm 14 and shaft 13 counter-clockwise about the center of 13. Arm 43 moves pad 49 a little further from nozzle 42, more air escapes from nozzle 42 and the pressure in 34 goes down. The stress in top 38 plus atmospheric pressure plus the force of gravity if rod 39 is in the vertical portion causes top 38 to move down against the reduced pressure in 37 until sufficient stress in 38 is relieved to balance the forces on top 38. Valve 27 has taken a new position nearer seat 29 so less air escapes through exhaust conduit 31. This builds up pressure in conduits 26, 51, 52 and 53 and in Bourdon tube 66. Increased pressure in Bourdon tube 66 tends to straighten the same and through pivot 69 to move arm 43 clockwise in resistance to the counter-clockwise movement caused by the increase in velocity of the fluid in pipe 11. Pad 49 therefore moves to restrict nozzle 42 which in turn builds up pressure in conduits 36 and 34 and tends to move valve 27 away from seat 29. It will therefore, be seen that whatever force is created by the fluid flowing in conduit 11, that force against target 12 creates through the mechanism mounted on base 6 an equal and opposite force so that target 12 does not move more than about 1/32 of an inch in actual practice. The distance that target 12 moves is not critical and can be made larger or smaller, the greatest movement being at the highest velocity of fluid in 11 that the device will measure.

This equal and opposite force on target 12 depends on pressure in conduits 26, 51, 52 and 53 and Bourdon tube 66. Since the force exerted by the Bourdon tube is roughly equal to its cross sectional area times the pressure in the tube, this pressure in conduit 51 is a function of the velocity of the fluid in conduit 11 and by proper calibration may be recorded as such on pressure gage 54 because the force on target 12 varies roughly as the square root of the velocity of the fluid flowing within conduit 11.

Figure 5:
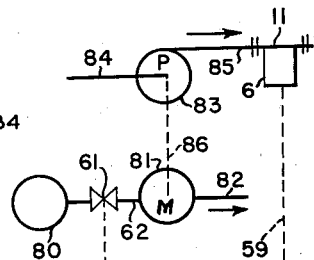
Figure 5 is a diagram of another system embodying the present invention.

Similarly this same pressure in conduit 52 may control a fluid motor 58 which in turn may regulate through a suitable regulating element 59 any desired part of the system. For purposes of illustration, linkage element 59 opens or closes valve 61 controlling the flow of fluid through pipe 62. The amount of fluid flowing through pipe 62 may control any other element, and if desired the system could be constructed so that the amount of fluid flowing through 62 would control the velocity of fluid in 11 so that the system would be a means of maintaining a constant velocity of fluid in 11. If conduit 62 were supplying pressure fluid to operate motor 81 to drive pump 83 as shown in Figure 5 and as described above to force fluid through 11 such would be the case.

The operation of Figure 4 is similar except that it is simpler and more direct. A constant air pressure is maintained in 21 but this air pressure varies in chamber 74 because of losses through nozzle 78. When target 12 is moved counter-clockwise about the axis of shaft 13 by fluid in 11, this moves arm 72 and nozzle 78 against lug 79. Less air escapes from nozzle 78 and the pressure in Bourdon tube 77, chamber 74 and conduit 53 goes up. This rising pressure tends to straighten out Bourdon tube 77 to move arm 72 clockwise about 13 and counterbalance the force on target 12, at the same time allowing escape of more air between nozzle 78 and lug 79. It therefore is evident that a balance of forces is set up in Figure 4 similar to that of Figure 1, and it is also evident that the pressure in 53 of Figure 4 may operate a recorder 54 and/or a fluid motor 58 as shown in Figure 1.

While I have shown two specific embodiments of my invention, which embodiments are preferred ways of practicing the invention, they are nevertheless merely shown for purposes of illustration and should not be regarded as limiting the invention, the scope of which is commensurate with the appended claims.

Having described my invention, I claim:

1. A flow responsive device for controlling an element in response to said flow, comprising a base relative to which said fluid is flowing, a shaft pivoted to said base about an axis disposed perpendicular to the direction of flow of said fluid, a first lever arm secured to said shaft and extending into said fluid, a target on said first lever arm in said fluid, a second lever arm secured to said shaft, a Bourdon tube secured at one end directly to said second lever arm and at the other end to said base, a valve body mounted on said base, a chamber in said body, said body having a first and second valve seat forming opposite ends of said chamber, a control conduit communicating between the interior of said Bourdon tube and the interior of said chamber intermediate said seats, a valve in said chamber movable to seat and close either said first or second valve seats, an exhaust conduit connecting said first seat to the atmosphere, a source of fluid under constant pressure, a first supply conduit connecting said second seat to said source, a first fluid motor connected to said valve to move the same between said seats, a second supply conduit having a bleed nozzle secured to said base adjacent to said second lever arm, said second lever arm being disposed in pivoting about said axis to variably restrict flow out of said nozzle, a connecting conduit containing a restricted orifice therein connecting said first and second supply conduits, said second supply conduit being also connected to said first fluid motor, and means comprising a second fluid motor, an element driven by said second fluid motor and a fourth conduit connecting said control conduit and said second fluid motor.

2. A flow responsive device for indicating the rate of flow of a flowing fluid comprising a base relative to which said fluid is flowing, a shaft pivoted to said base about an axis disposed perpendicular to the direction of flow of said fluid, a first lever arm secured to said shaft and extending into said fluid, a target on said first lever arm in said fluid, a second lever arm secured to said shaft, a Bourdon tube secured to one end directly to said second lever arm and at the other end to said base, a valve body mounted on said base, a chamber in said body, said body having a first and second valve seat forming opposite ends of said chamber, a control conduit communicating between the interior of said Bourdon tube and the interior of said chamber intermediate said seats, a valve in said chamber movable to seat and close either said first or second valve seats, an exhaust conduit connecting said first seat to the atmosphere, a source of fluid under constant pressure, a first supply conduit connecting said second seat to said source, a first fluid motor connected to said valve to move the same between said seats, a second supply conduit having a bleed nozzle secured to said base adjacent to said second lever arm, said second lever arm being disposed in pivoting about said axis to variably restrict flow out of said nozzle, a connecting conduit containing a restricted orifice therein connecting said first and second supply conduits, said second supply conduit being also connected to said first fluid motor, and indicating means comprising a pressure gage connected to indicate the same pressure as in said Bourdon tube and thereby indicate the rate of flow of said fluid.

3. A flow responsive device for controlling an element in response to said flow, comprising a base relative to which said fluid is flowing, a shaft pivoted to said base about an axis disposed perpendicular to the direction of flow of said fluid, a first lever arm secured to said shaft and extending into said fluid, a second lever arm secured to said shaft, a first fluid motor having relatively movable portions, one portion being secured at one end directly to said second lever arm and the other portion being secured at the other end to said base, a source of fluid under constant pressure, a bleed nozzle adjacent to said second lever arm, said second lever arm being disposed in pivoting about said axis to variably restrict flow out of said nozzle, means forming a restricted orifice, a first supply conduit connecting said source through said restricted orifice to said nozzle, means comprising a second fluid motor, an element driven by said second fluid motor and a second conduit connecting said first fluid motor and said second fluid motor, valve means including a passage selectively connectible with said source or the atmosphere, a third supply conduit connecting said second conduit with said passage, and means responsive to pressure in said first supply conduit between said orifice and said nozzle to selectively position said valve means to balance the forces on said first lever arm.

4. A flow responsive device for indicating the rate of flow of a flowing fluid comprising a base relative to which said fluid is flowing, a shaft pivoted to said base about an axis disposed perpendicular to the direction of flow of said fluid, a first lever arm secured to said shaft and extending into said fluid, a second lever arm secured to said shaft, a first fluid motor having relatively movable portions, one portion being secured at one end directly to said second lever arm and the other portion being secured at the other end to said base, a source of fluid under constant pressure, a bleed nozzle adjacent to said second lever arm, said second lever arm being disposed in pivoting about said axis to variably restrict flow out of said nozzle, means forming a restricted orifice, a first supply conduit connecting said source through said restricted orifice to said nozzle, indicating means comprising a pressure gage connected to indicate the pressure in said fluid motor and thereby indicate the rate of flow of said fluid, valve means including a passage selectively connectible with said source or the atmosphere, a second supply conduit connecting said fluid motor and said pressure gage with said passage, and means responsive to pressure in said first supply conduit between said orifice and said nozzle to selectively position said valve means to balance the forces on said first lever arm.

5. A flow responsive device for controlling an element in response to said flow, comprising a base relative to which said fluid is flowing, a shaft pivoted to said base about an axis disposed perpendicular to the direction of flow of said fluid, a first lever arm secured to said shaft and extending into said fluid, a second lever arm secured to said shaft, a first fluid motor having relatively movable portions, one portion being secured at one end directly to said second lever arm and the other portion being secured at the other end to said base, a valve body mounted on said base, a chamber in said body, said body having a first and second valve seat forming opposite ends of said chamber, a control conduit communicating between the interior of said first fluid motor and the interior of said chamber intermediate said seats, a valve in said chamber movable to seat and close either said first or second valve seats, an exhaust conduit connecting said first seat to the atmosphere, a source of fluid under constant pressure, a first supply conduit connecting said second seat to said source, a second fluid motor connected to said valve to move the same between said seats, a second supply conduit having a bleed nozzle secured to said base adjacent to said second lever arm, said second lever arm being disposed in pivoting about said axis to variably restrict flow out of said nozzle, a connecting conduit containing a restricted orifice therein connecting said first and second supply conduits, said second supply conduit being also connected to said second fluid motor, and means comprising a third fluid motor, an element driven by said third fluid motor and a sixth conduit connecting said control conduit and said third fluid motor.

6. A flow responsive device for indicating the rate of flow of a flowing fluid comprising a base relative to which said fluid is flowing, a shaft pivoted to said base about an axis disposed perpendicular to the direction of flow of said fluid, a first lever arm secured to said shaft and extending into said fluid, a second lever arm secured to said shaft, a first fluid motor having relatively movable portions, one portion being secured at one end directly to said second lever arm and the other portion being secured at the other end to said base, a valve body mounted on said base, a chamber in said body, said body having a first and second valve seat forming opposite ends of said chamber, a control conduit communicating between the interior of said first fluid motor and the interior of said chamber intermediate said seats, a valve in said chamber movable to seat and close either said first or second valve seats, an exhaust conduit connecting said first seat to the atmosphere, a source of fluid under constant pressure, a first supply conduit connecting said second seat to said source, a second fluid motor connected to said valve to move the same between said seats, a second supply conduit having a bleed nozzle secured to said base adjacent to said second lever arm, said second lever arm being disposed in pivoting about said axis to variably restrict flow out of said nozzle, a connecting conduit containing a restricted orifice therein connecting said first and second supply conduits, said second supply conduit being also connected to said second fluid motor, and indicating means comprising a pressure gage connected to indicate the same pressure as in said first fluid motor and thereby indicate the rate of flow of said fluid.

LOUIS D. KLEISS.

REFERENCES CITED

The following references are of record in the file of this patent:

UNITED STATES PATENTS

| Number | Name | Date |
| --- | --- | --- |
| 1,407,060 | Graemiger | Feb. 21, 1922 |
| 1,414,387 | Wilson | May 2, 1922 |
| 2,033,306 | Schofield | Mar. 10, 1936 |
| 2,223,712 | Ziebolz | Dec. 3, 1940 |
| 2,295,728 | Gess | Sept. 15, 1942 |
| 2,311,853 | Moore | Feb. 23, 1943 |
| 2,383,757 | Ziebolz | Aug. 28, 1945 |
| 2,536,198 | Matner et al. | Jan. 2, 1951 |

FOREIGN PATENTS

| Number | Country | Date |
| --- | --- | --- |
| 525,674 | Great Britain | Sept. 2, 1940 |